Nov. 5, 1929.  G. B. INGERSOLL  1,734,581

SELF LUBRICATING PIN

Filed May 5, 1927

INVENTOR
George B. Ingersoll

Patented Nov. 5, 1929

1,734,581

UNITED STATES PATENT OFFICE

GEORGE B. INGERSOLL, OF DEARBORN, MICHIGAN, ASSIGNOR TO FEDERAL MOTOR TRUCK CO., OF DETROIT, MICHIGAN

SELF-LUBRICATING PIN

Application filed May 5, 1927. Serial No. 189,056.

My invention relates to certain new and useful improvements in self-lubricating pins as used in spring installations of motor vehicles; and the objects of my improvements are, first, to provide a pin or shaft having a lubricant reservoir contained therein with means for efficiently conveying the lubricant to its bearing surfaces; second, to provide a self-lubricating pin having a minimum number of parts; third, to provide a means for conveying the lubricant from its reservoir to the bearing surfaces with a minimum destruction of the bearing surfaces; fourth, to provide means for economically conveying the lubricant to the lower bearing surfaces of the pin; fifth, to provide a pin having a maximum and concentric lubricant reservoir; and sixth, to provide a maximum of safety for the preservation of the lubricant supply reservoir from accident.

I attain these objects by the mechanism illustrated in the accompanying drawings, in which—

Figure 1:
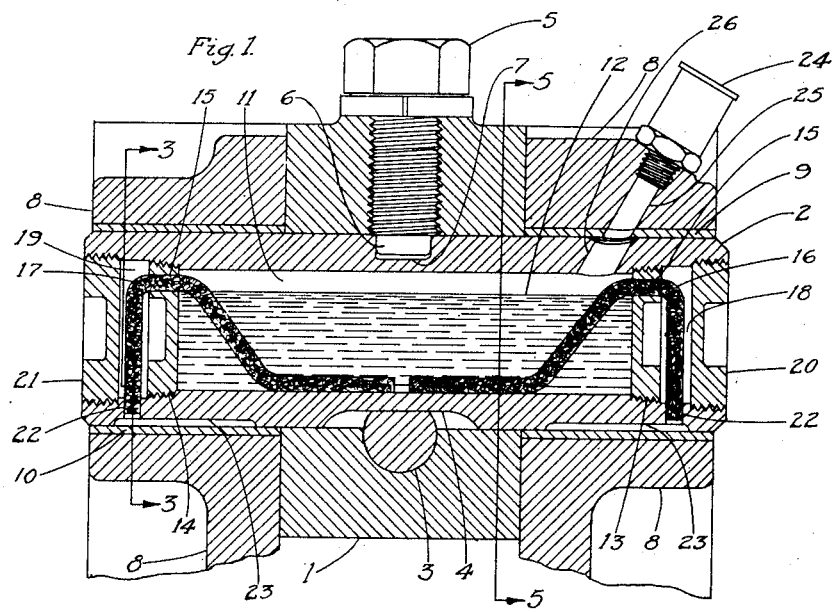
Figure 3:
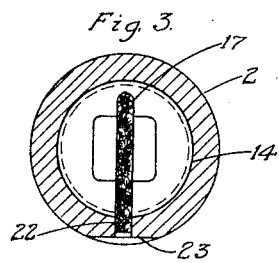
Figure 4:
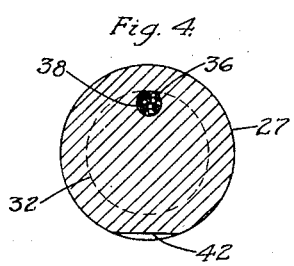
Figure 5:
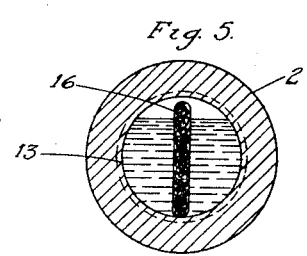
Figure 2:
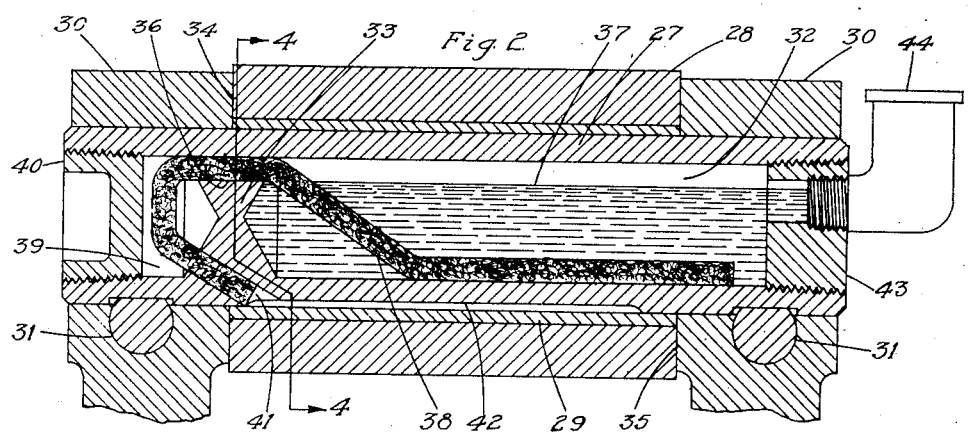

Figure 1 is a sectional view of a spring trunnion pin assembled in its supporting bracket; Fig. 2, a sectional view of a spring pin assembled in its supporting shackles; Fig. 3, a sectional view of the spring trunnion pin on the line 3—3, Fig. 1; Fig. 4, a sectional view of a spring pin on the line 4—4, Fig. 2; and Fig. 5, a sectional view of the spring trunnion pin on the line 5—5, Fig. 1.

Similar numerals refer to similar parts throughout the several views.

Fig. 1 discloses the invention in a preferred form for lubricating a trunnion pin used in six wheel vehicle construction. The bracket 1 is suitably connected to the vehicle frame, not shown, and supports the trunnion pin 2 which is securely locked in the bracket 1 by the drawkey 3 which contacts with a flat spot 4 on the pin 2. The pin 2 is further prevented from turning by means of the set screw 5 which has an extension 6 engaging the hole 7 in the pin 2. The springs, not shown, are supported on the bracket 8 which has bushings 9 and 10 having their bearing on the pin 2. The inner reservoir 11, containing the lubricant 12, is closed at its ends by the threaded plugs 13 and 14. The threaded plugs 13 and 14 have a drilled hole 15 at their upper sides which control the height of the lubricant 12. The wicks 16 and 17 are deposited in the lubricant reservoir 11 in such manner as to absorb the lubricant 12. The wicks 16 and 17 extend through the holes 15 at the top of the threaded plugs 13 and 14 into the outer reservoirs or chambers 18 and 19 which are closed by the plugs 20 and 21 being threaded into the ends of the pin 2. The plugs 20 and 21 are larger in diameter than the plugs 13 and 14, thus permitting the assembly of the inner plugs 13 and 14 in the pin 2. The wicks 16 and 17 extend to the bottom of the outer reservoir or chambers 18 and 19 and into the holes 22 which connect the outer reservoir or chambers 18 and 19 with the lower side of the bushings 9 and 10. Thus the lubricant 12 is fed by capillary attraction from the inner reservoir 11 to the outer reservoir or chambers 18 and 19 and to the loaded side of the bearing in the bushings 9 and 10. The lubricant may be conducted to any desired side of the bearing in the bushings 9 and 10, but is here shown at loaded or bottom side. From the holes 22 the lubricant is distributed along the bushings 9 and 10 by means of the flatted surfaces 23 on the pin 2. The lubricant cup 24 is suitably mounted in the bracket 8 and is connected by the holes 25 and 26 to the inner reservoir 11, thus permitting of easy replenishing of the lubricant.

Fig. 2 discloses the invention in a preferred form for lubricating a spring pin 27 used in the eye of the spring 28, the spring pin 27 having a bearing in the bushing 29 which is pressed into the spring 28. The spring pin 27 is locked in the shackle 30 by means of the drawkeys 31. The reservoir 32 has a closed end 33 located near one of the ends of the spring pin 27. This closed end 33 may be formed with a threaded plug, similar to 14, or it may be formed by drilling out the spring pin 27 from each end, as shown, leaving a solid wall of metal between the drilled holes. By locating the closed end 33 directly under the contacting surfaces 34 of the spring 28 and the shackle 30, the ability of the spring pin 27 to resist the shear load, due to the spring load, is greatly increased. The spring pin 27, being in double shear at the surfaces 34 and 35, is thus made much stronger at one of its shear points and enables a larger diameter reservoir 32 to be incorporated without undue decrease in the strength of the spring pin 27. A hole 36 is drilled through the closed end 33 which controls the height of the lubricant 37. The wick 38 is deposited in the lubricant reservoir 32 in such manner as to absorb the lubricant 37. The wick 38 extends through the hole 36 and into the outer reservoir or chamber 39 which is closed by the plug 40 being threaded into the end of the spring pin 27. The wick 38 extends to the bottom of the outer reservoir or chamber 39 and into the hole 41 which connects the outer reservoir or chamber 39 with the lower side of the bushing 29. The spring pin 27 has a slight flat 42 which distributes the lubricant along the bushing 29. One end of the reservoir 32 is closed by means of the threaded plug 43 into which is mounted the lubricant cup 44 which permits of easy replenishing of the lubricant 37.

This method of wick installation in a reservoir within a pin itself makes for a very efficient conveyance of the lubricant to the bearings and insures a continuous and economical supply at all times, thus rendering the reservoir in the usual size of pin to be sufficient for a considerable length of time. The pin being made to incorporate the reservoir decreases the number of parts as usually employed to convey a lubricant from an exterior source. This method permits of an installation which conserves to the utmost the bearing area of the pin as the small lead hole necessary may be directed into the flatted portion on the bearing portion of the pin, the flatted portion being embodied in nearly all pins as the usual means of distributing the oil along the pin.

Also, the incorporation of the lubricant reservoir within the pin itself removes it from the danger zone of accidents, as any extensions of either the pin or parts attached to the pins render it liable to injury in accidents, etc.

The foregoing descriptions show the invention in detail in preferred installations, in order that the invention may be clearly displayed, but it is not intended that the design is to be restricted or confined to the details shown; but it is understood that it may be modified and changed to meet the individual manufacturer's need or desires without departing from the scope or spirit of the invention.

I claim:

1. In a self-lubricating pin having an outer bearing surface, the combination of a lubricant reservoir having closed ends, the said lubricant reservoir being contained within the length of the outer bearing surface of the pin, an auxiliary chamber adjacent one end of the said reservoir, the said auxiliary chamber being contained within the length of the outer bearing surface of the pin, a passage connecting the said auxiliary chamber and the said reservoir, a second passage connecting the said auxiliary chamber and the bearing surface of the pin, and a wick disposed within the said reservoir, the said first-mentioned passage, the said auxiliary chamber, and the said second passage.

2. In a self-lubricating pin having a bearing surface, the combination of a lubricant reservoir having closed ends, the said lubricant reservoir being entirely contained within the projected bearing length of the pin, a wick extending from the said lubricant reservoir to the bearing surface of the pin, the said wick passing through one of the closed ends of the said lubricant reservoir, and means for filling the said lubricant reservoir.

3. In a self-lubricating pin having bearing surfaces, the combination of a lubricant reservoir having closed ends, an auxiliary chamber located adjacent each closed end of the said lubricant reservoir, and means for conveying the lubricant from the said reservoir through the said auxiliary chambers to the bearing surfaces of the pin.

4. In a self-lubricating pin having bearing surfaces, the combination of a lubricant reservoir contained entirely within the nominal length of the pin, means for conveying the lubricant, by capillary attraction, to a point above the level of the lubricant in the said lubricant reservoir, the said means being further adapted to convey the lubricant, from the point above the level of the lubricant in the lubricant reservoir, by capillary attraction and the force of gravity, to the bearing surfaces of the pin, and means for filling the said lubricant reservoir.

5. In a self-lubricating pin having bearing surfaces, the combination of a lubricant reservoir with closed ends entirely contained within the pin, the said lubricant reservoir having a lesser length than the pin, an auxiliary chamber located adjacent the bearing surfaces of the pin and connected therewith, a passage connecting the said lubricant reservoir and the said auxiliary chamber, the said passage, by its location, determining the height of the lubricant in the said reservoir, means for conveying the lubricant through the said passage and the said auxiliary chamber to the bearing surfaces of the pin, and means for filling the said lubricant reservoir.

6. A self-lubricating pin comprising a hollow center, threaded members for closing a portion of the said hollow center, auxiliary chambers located adjacent the said threaded members, relatively larger threaded members for closing the ends of the auxiliary chambers, a lubricant filling the said hollow center to a pre-determined level, bearing surfaces on the pin, means for conveying the said lubricant to a point, within the said auxiliary chamber, above its pre-determined level and to the said bearing surfaces, and means for replenishing the said lubricant in the said hollow center.

7. The combination of a hollow pin having a lubricant reservoir extending lengthwise thereof, the lubricant reservoir being provided with ends having through holes, an opening extending radially through the wall and to the periphery of the said hollow pin, and a capillary member disposed in the lubricant reservoir of the said hollow pin, the said capillary member extending through the holes in the ends of the lubricant reservoir into the openings extending radially through the walls of and to the periphery of the said hollow pin.

GEORGE B. INGERSOLL.